Figure 1:
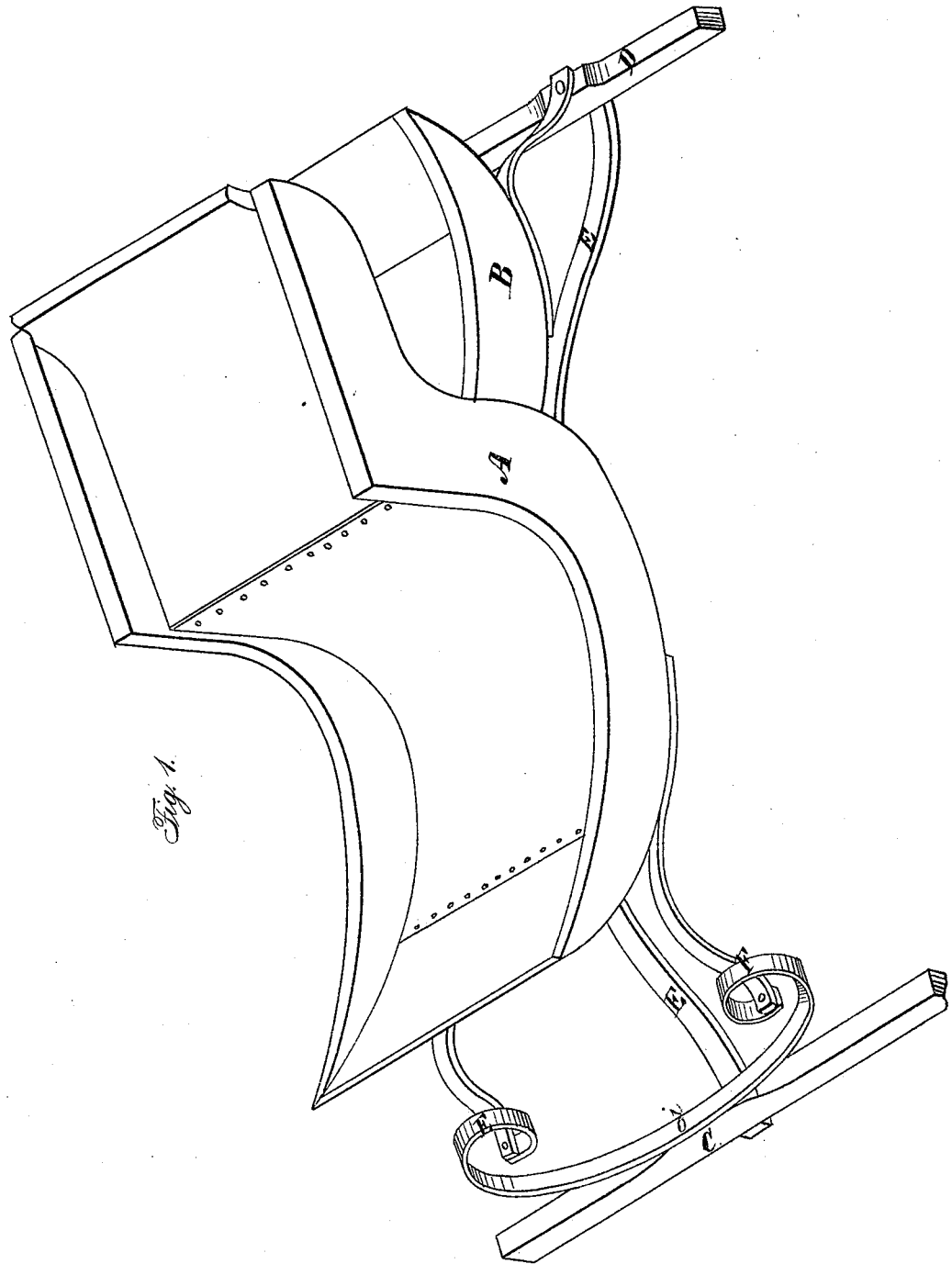

GREEN & WHEELER.
Carriage-Spring.

No. 14,766.

2 Sheets—Sheet 1.

Patented Apr. 29, 1856.

GREEN & WHEELER.
Carriage-Spring.
No. 14,766.
2 Sheets—Sheet 2.
Patented Apr. 29, 1856.
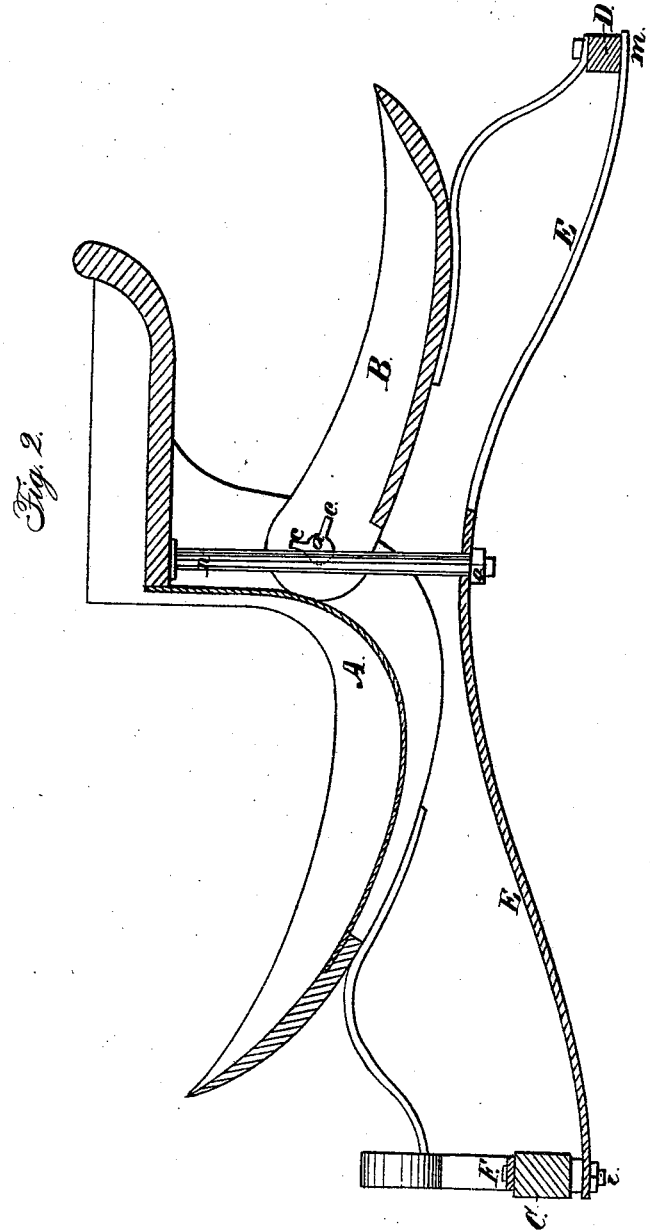

UNITED STATES PATENT OFFICE.

EDWIN J. GREEN AND MOSES H. WHEELER, OF CEDARVILLE, NEW YORK.

JOINT-BODIED BUGGY.

Specification of Letters Patent No. 14,766, dated April 29, 1856.

*To all whom it may concern:*

Be it known that we, EDWIN J. GREEN and MOSES H. WHEELER, of Cedarville, in the county of Herkimer and State of New York, have invented certain new and useful Improvements in Joint-Body Buggies or Carriages; and we do hereby declare the following to be a full, clear, and exact description of the same, reference being had to the accompanying drawings, making a part thereof, in which—

Figure 1 represents a perspective view of the carriage without the running gear, Fig. 2 represents a longitudinal vertical section through the same.

Similar letters where they occur in the two figures denote like parts.

The nature of our invention consists in so combining a joint-body with a spring perch, and supporting the seat of the carriage on the spring perch by means of a bolt or other support, as that the half spring heretofore used under the seat may be dispensed with, and the perch become the spring for the body or seat part of the body, as will be described.

To enable others skilled in the art to make and use our invention we will proceed to describe the same with reference to the drawings.

A, represents the front, and B, the rear section of the body of the carriage—the two sections being hinged together, by a bolt *a* which is secured to the front section A, said bolt having upon it a feather *c*, and passing through a hole and slot *e* in the sides of the rear section, so that after said bolt is passed through the rear section, and said section slightly turned, the feather *c*, becomes as it were a key pin to hold the sections together. The sections are of course hinged or pivoted together at both sides. The body of the carriage thus jointed or hinged together, is united to the axles C, D, as represented in the drawings, or in any other well known manner. The axles C, D, are united by a spring perch or reach E, the front end of which reach is secured to the bolt *i*, below the axle C, said bolt passing through the spring F, axle C, and then securing by means of nuts and washer to the end of the spring reach E, but so that the axle may turn on said bolt, while the other parts are rigid. The spring perch, forks at about its center one of each forks passing outward, and secured to the rear axle D, at *m*. The spring perch is arched upward as seen in the drawing, to give it the necessary strength, with due regard to lightness.

To the under side of the seat part of the body is secured a bolt or rod *n*, which passes down, and by a shoulder rests on the perch or reach E, and is held thereto by a nut *o*, on the underside of the reach. By thus supporting the seat part of the body on the perch we avoid the use of the half spring heretofore used under the seat, or indeed any other spring, and to this extent cheapen the cost of the carriage.

The sides of the body may be of cast iron and highly ornamented, and when so cast the bolts in one section, and the holes and slots in the other section by which they are hinged together, may be cast fast to, or at the same time with said sides. It is obvious that the bolt *a* may be on the rear section and the slotted hole on the front section if so preferred. And we would further remark that, although we describe our invention as avoiding the half spring under the seat, yet in heavier carriages that spring may be used in connection with the bolt and perch; and so long as the weight on the seat is carried to the spring perch, whether through the bolt alone, or the bolt united to, or acting in connection with another spring, we should claim it as our invention, the object being to use the perch as the ultimate spring for the seat.

Having thus fully described the nature of our invention, what we claim therein as new and desire to secure by Letters Patent is,

Supporting the front or seat section, of a joint-body carriage, on a spring reach, by means of a bolt or equivalent support, whereby we avoid the use of the spring as heretofore used under the seat, but still have the advantages of said spring, by using the spring reach as such, substantially as set forth.

E. J. GREEN.
M. H. WHEELER.

Witnesses:
D. D. GOLDEN,
WINSLOW SMITH.